US011126850B1

(12) United States Patent
Ichim et al.

(10) Patent No.: US 11,126,850 B1
(45) Date of Patent: Sep. 21, 2021

(54) SYSTEMS AND METHODS FOR DETECTING OBJECTS WITHIN THE BOUNDARY OF A DEFINED SPACE WHILE IN ARTIFICIAL REALITY

(71) Applicant: Facebook Technologies, LLC, Menlo Park, CA (US)

(72) Inventors: Alexandru-Eugen Ichim, Ruschlikon (CH); Sarthak Ray, Santa Clara, CA (US); Alexander Sorkine Hornung, Zurich (CH); Gioacchino Noris, Zurich (CH); Gaurav Chaurasia, Zurich (CH); Jan Oberländer, Binningen (CH)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/844,913

(22) Filed: Apr. 9, 2020

(51) Int. Cl.
*G06K 9/00* (2006.01)
*G06F 3/01* (2006.01)
*G06T 19/00* (2011.01)
*G06T 15/20* (2011.01)
*G06T 7/73* (2017.01)

(52) U.S. Cl.
CPC ......... *G06K 9/00671* (2013.01); *G06F 3/013* (2013.01); *G06T 7/74* (2017.01); *G06T 15/205* (2013.01); *G06T 19/006* (2013.01); *G06T 2207/10028* (2013.01)

(58) Field of Classification Search
None
See application file for complete search history.

(56) References Cited

U.S. PATENT DOCUMENTS

| 10,451,875 | B2* | 10/2019 | Sutherland | G02B 27/017 |
| 2013/0225296 | A1 | 8/2013 | Kim | |
| 2014/0306993 | A1* | 10/2014 | Poulos | G06T 19/006 |
| | | | | 345/633 |
| 2015/0265920 | A1* | 9/2015 | Kim | A63F 13/577 |
| | | | | 463/31 |

(Continued)

FOREIGN PATENT DOCUMENTS

| CN | 108628442 A | 10/2018 |
| EP | 3037917 A1 | 6/2016 |
| EP | 3430498 A1 | 1/2019 |

OTHER PUBLICATIONS

International Search Report and Written Opinion for Application No. PCT/US2021/021292, dated Jun. 21, 2021, 5 pages.

*Primary Examiner* — Ryan M Gray
(74) *Attorney, Agent, or Firm* — Baker Botts L.L.P.

(57) ABSTRACT

In one embodiment, a method includes generating a plurality of spatial points based on depth measurements of physical objects within a physical space surrounding a user and determining, based on the spatial points, a location at which a physical object is likely to exist. The method then renders, based on the location of the physical object, a virtual space representing the physical space. This virtual space may include a virtual object representing the physical object. The method displays the virtual space to the user, and, while displaying the virtual space, receives input from the user indicating a boundary of a subspace within the virtual space, and detects that at least a portion of the virtual object is within the subspace. Finally, the method updates the virtual space to indicate that the portion of the virtual object is within the subspace.

19 Claims, 15 Drawing Sheets

(56) References Cited

U.S. PATENT DOCUMENTS

| | | | |
|---|---|---|---|
| 2016/0027212 A1* | 1/2016 | Da Veiga | H04N 13/344 |
| | | | 345/633 |
| 2016/0124502 A1* | 5/2016 | Sawyer | G02B 27/017 |
| | | | 345/633 |
| 2016/0350973 A1* | 12/2016 | Shapira | G06F 3/017 |
| 2017/0358141 A1* | 12/2017 | Stafford | A63F 13/537 |
| 2018/0012370 A1* | 1/2018 | Aghamohammadi | G06T 7/50 |
| 2018/0093186 A1* | 4/2018 | Black | G06T 11/60 |
| 2018/0310116 A1* | 10/2018 | Arteaga | G06T 19/006 |
| 2019/0005728 A1* | 1/2019 | Leppanen | G06T 19/006 |
| 2019/0033989 A1 | 1/2019 | Wang | |
| 2019/0043259 A1* | 2/2019 | Wang | G06F 3/04815 |
| 2020/0026922 A1* | 1/2020 | Pekelny | G06T 19/006 |
| 2020/0065584 A1* | 2/2020 | Iyer | G06T 7/70 |
| 2020/0218426 A1* | 7/2020 | Ekambaram | G06F 3/04815 |

* cited by examiner

SYSTEMS AND METHODS FOR DETECTING OBJECTS WITHIN THE BOUNDARY OF A DEFINED SPACE WHILE IN ARTIFICIAL REALITY

TECHNICAL FIELD

This disclosure generally relates to augmented-reality, virtual-reality, mixed-reality, or hybrid-reality environments.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a headset/head-mounted display (HMD) connected to a host computer system, a standalone HMD, a mobile device or computing system, or any other hardware platform capable of providing artificial reality content to one or more viewers.

When immersed in such artificial reality, particularly VR, via an HMD, a user's view of the real world may be blocked by the physical structure of the HMD. Because objects in the real world and intruders may pose a hazard to the user, there is a need to make the user aware of their presence.

SUMMARY OF PARTICULAR EMBODIMENTS

In the context of augmented or virtual reality (AR/VR), a user may virtually define a space that corresponds to a region in physical space in which the user may safely move (for example, to play a game) while wearing a headset, such as an HMD. The boundaries of this space may be drawn using hand gestures or controllers (e.g., the hand gesture or controller's orientation may be analogous to a virtual laser pointer) along the ground, and the VR system will then construct virtual walls along these boundaries by extending the 2D boundary on the ground upward. However, some users may have difficulty grasping the necessary requirements for a clear, safe space before entering VR. Additionally, when creating the initial boundaries, they may be focused on the actual process of tracing them out (e.g., may be focused on the floor that he is drawing the boundary over with the laser pointer), and thus may not notice unwanted objects (such as a chair) that are left within the boundary, or that protrude past the boundary from the outside (such as the edge of a table). These objects may further be invisible to a user when the user is wearing the HMD and is immersed in VR media, and thus may pose a safety hazard to the user due to the risk of collision.

Particular embodiments described herein pertain to an intrusion detection system that detects potential hazards or free space and is designed to alert the user when an object is within the defined space of the user. The system may generate a point cloud corresponding to observable objects in the room. However, this point cloud may be noisy, so the existence of a point does not necessarily mean that it corresponds to an actual physical object. Thus, rather than relying on the points as absolute indicators of the existence of physical objects, the system may use them to assess the likelihood of a particular region in space being occupied by a physical object and alert the user when that likelihood is sufficiently high.

In particular embodiments, the system may generate a virtual space that corresponds to a physical region that the user is in and divide that virtual space into voxels. Using computer vision techniques, the system may detect observable features in the user's surroundings and generate a corresponding point cloud for those features. Each point in the point cloud may have coordinates in the virtual space and fall within a voxel. In particular embodiments, each voxel may have one of three possible states: free, occupied, or unknown. Voxels may start off unknown, and rays may be cast from the estimated position of the HMD towards the points in the point cloud to determine which voxels are free and which are occupied. In particular embodiments, the presence of a point in a voxel counts as a vote towards that voxel being occupied by a physical object. The voxels that the ray passes through as the ray is cast towards the point (or from the point towards the user) would each receive a vote for a state of "free", based on the assumption that if the point corresponding to an observable feature is visible to the cameras of the HMD, then the space between the HMD and the point should be free of objects; otherwise, the feature corresponding to that point would not be observable. After this process is performed for each point in the point cloud, the system may determine whether each voxel is likely to be occupied or free based on the votes it received.

However, because the points may be very noisy, especially as the distance between them and the HMD increases, temporal and/or density values may be considered when determining whether a voxel with a state of occupied is indeed occupied. For example, a voxel that has received at least one "occupied" vote may nevertheless be free if, for example, the voxel has received relatively few "occupied" votes (e.g., 1, 2, or 5 points in the point cloud are within the voxel), its neighboring voxels are free, and/or if it changes states quickly over time. On the other hand, if the voxel has received relatively more "occupied" votes (e.g., 10, 15, or 20 points in the point cloud are within the voxel), has occupied neighboring voxels, and/or remains occupied for a threshold amount of time, it may be recognized as truly occupied by a physical object. These occupied voxels may then be compared to the boundary drawn by the user, to determine whether the detected object is inside or outside the defined space and whether an alert is warranted. Once an intruding object is determined, the user may be alerted to its presence in a number of visual or audio manners.

In particular embodiments, additional rules may dictate whether an occupied voxel in the user's defined space should trigger an alert. For example, one rule may be configured to filter out occupied voxels that are likely to correspond to the user's arms or legs. For example, an occupied voxel that lies beyond a threshold distance from the user may trigger an alert for the user, but occupied voxels that are within the threshold distance may be ignored, (so as to not alert the user of his own arms or legs).

Certain technical challenges exist in creating boundaries of a defined space in which a user will become immersed in artificial reality. When users draw a boundary, they may not understand the requirements for creating a clear, safe defined space, or they may simply overlook objects within the space. If boundaries that were previously drawn are automatically re-created in a future session upon system startup, a user may not realize that objects in the larger physical space have been moved, and that what was once a clear defined space is no longer empty. Further, a user may draw the boundary of a defined space, but may not realize that additional free space is available to be included in the defined space, and that the boundary could be expanded.

Accordingly, providing information to the user to alert him to these issues may assist the user in creating an ideal defined space. However, one technical challenge to this may include actually detecting any objects intruding into the user's defined space during setup. A solution presented by embodiments disclosed herein to address this challenge may thus include assessing the likelihood of a physical object being present within the boundary using voxels and a voting algorithm to categorize voxels having spatial points that appear to correspond to such a physical object being occupied or unoccupied. Another technical challenge may include determining whether additional free space exists within the larger physical space that may be incorporated into the user's defined space. A solution presented by embodiments disclosed herein to address this challenge may include advising the user of the existence of this free space and providing suggestions and/or tools to enable the user to edit or redraw the boundary.

Certain embodiments disclosed herein may provide one or more technical advantages. As an example, a voting algorithm and temporal decay process for detecting voxels that may be occupied by a physical object during setup may provide a more accurate detection of these objects over stereo reconstruction alone, and may further ensure that any identified occupied voxels are accurately updated when the user either moves the object or adjusts the boundary. As another example, alerting a user to the presence of objects within the boundary of the defined space may increase user safety when the user is immersed in artificial reality after setup. Similarly, advising the user that a more ideal boundary could be drawn may enhance user experience with artificial reality media. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims, but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
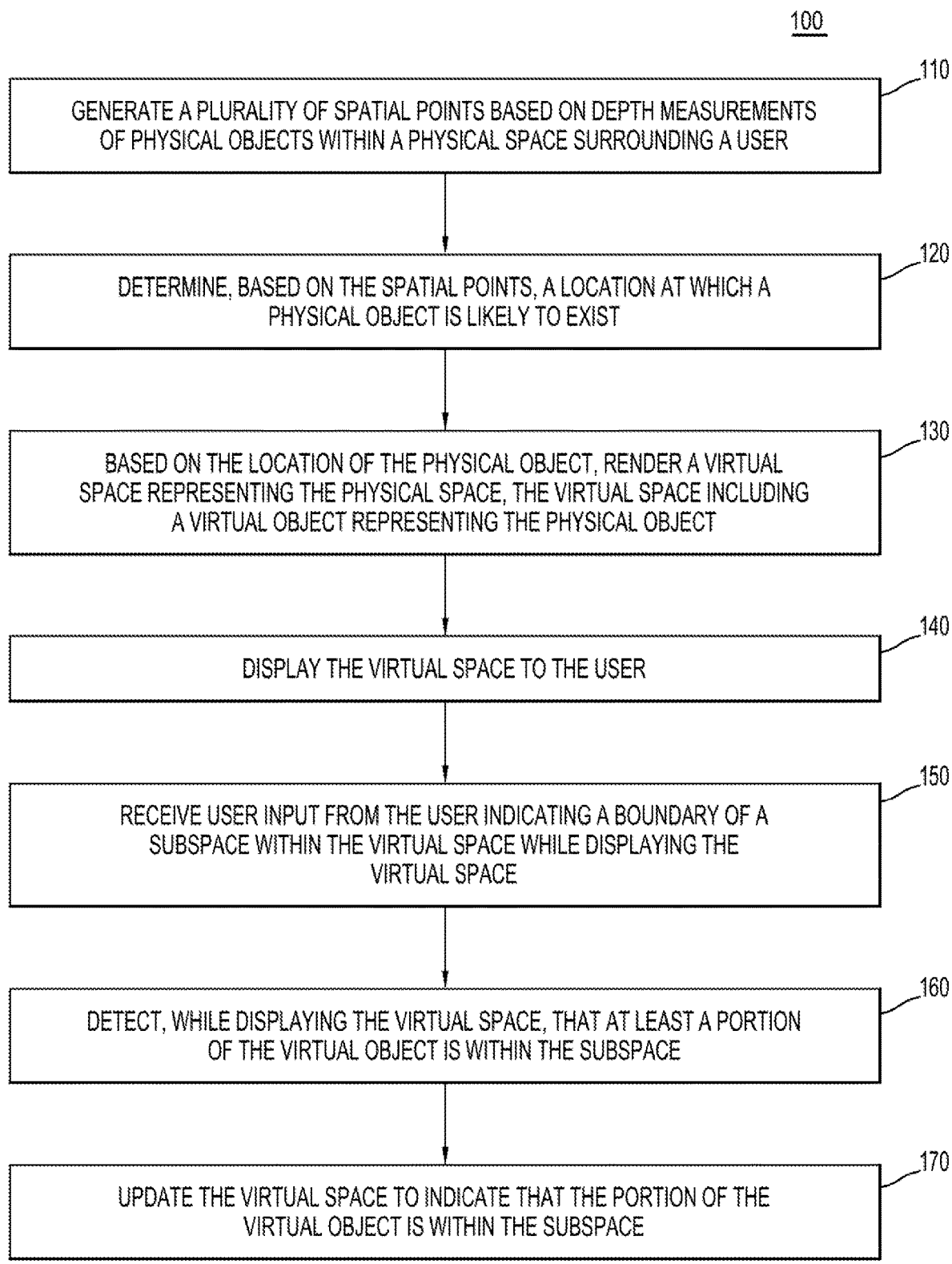
FIG. 1 illustrates an example method for detecting objects intruding into a user's defined space during guardian setup.

FIG. 1 illustrates an example method 100 for detecting objects intruding into a user's defined space during guardian setup. In particular embodiments, the system may determine whether one or more objects intrude into the defined space occupied by a user wearing an HMD (the defined space around the user may be referred to as "guardian" herein) during guardian setup. The method 100 may begin at step 110, in which an intrusion detection system generates spatial points based on depth measurements of physical objects within a physical space surrounding the user. This may be achieved by capturing images of the user's surrounding using externally-facing cameras and processing the images to detect observable features of objects. For any that are detected, the system may generate the spatial points based on the depth measurements of these observable features of physical objects. The points may be generated using stereoscopic techniques, for example. However, the generated spatial points may be noisy or inaccurate. Thus, at step 120, the intrusion detection system may determine, based on the spatial points, a location at which a physical object is likely to exist. As will be described in further detail below, the system may assess the likelihood of a location in space being occupied by a physical object using, for example, voxels and a voting algorithm. At step 130, the system may render, based on the location of the physical object, a virtual space representing the physical space. The virtual space may include a virtual object representing the physical object. At step 140, the system may display the virtual space to the user. At step 150, the system may, while displaying the virtual space to the user, receive user input from the user indicating a boundary of a subspace, or guardian, within the virtual space, and at step 160, the system may detect, still while displaying the virtual space to the user, that at least a portion of the virtual object that represents the physical object is within the guardian. Finally, at step 170, the system may update the displayed virtual space to indicate to the user that the portion of the virtual object is within the guardian.

Figure 2:
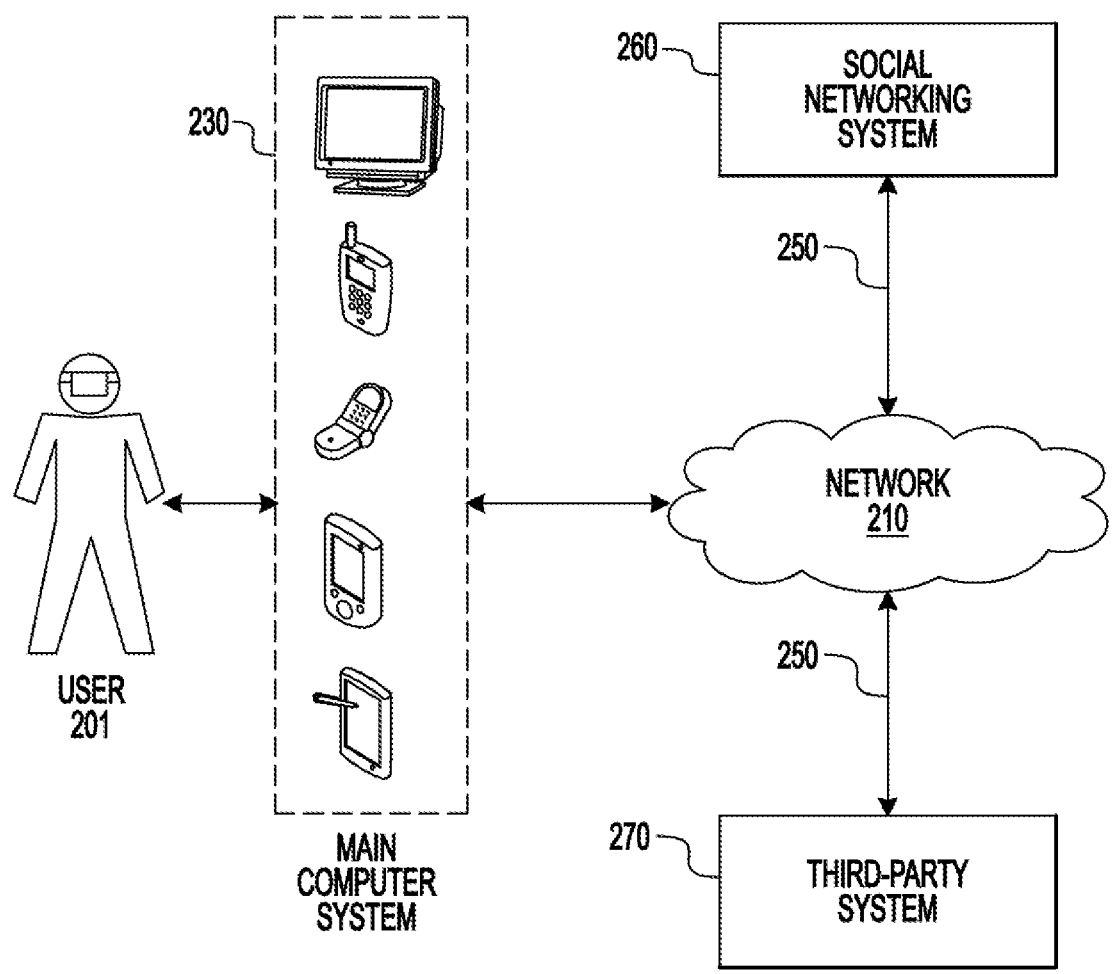
FIG. 2 illustrates an example network environment associated with an artificial reality device and a social networking environment.

FIG. 2 illustrates an example network environment 200 associated with an artificial reality device and a social networking environment. Network environment 200 includes a user 201 wearing an HMD, a main computer system 230, a social-networking system 260, and a third-party system 270 connected to each other by a network 210. Although FIG. 2 illustrates a particular arrangement of user 201, main computer system 230, social-networking system 260, third-party system 270, and network 210, this disclosure contemplates any suitable arrangement of user 201, main computer system 230, social-networking system 260, third-party system 270, and network 210. As an example and not by way of limitation, two or more of main computer system 230, social-networking system 260, and third-party system 270 may be connected to each other directly, bypassing network 210. As another example, two or more of main computer system 230, social-networking system 260, and third-party system 270 may be physically or logically co-located with each other in whole or in part. Moreover, although FIG. 2 illustrates a particular number of users 201, main computer systems 230, social-networking systems 260, third-party systems 270, and networks 210, this disclosure contemplates any suitable number of users 201, main computer systems 230, social-networking systems 260, third-party systems 270, and networks 210. As an example and not by way of limitation, network environment 200 may include multiple users 201, main computer systems 230, social-networking systems 260, third-party systems 270, and networks 210.

In particular embodiments, user 201 may be an individual that interacts or communicates with or over social-networking system 260. In particular embodiments, social-networking system 260 may be a network-addressable computing system hosting an online social network. Social-networking system 260 may generate, store, receive, and send social-networking data, such as, for example, user-profile data, concept-profile data, social-graph information, or other suitable data related to the online social network. Social-networking system 260 may be accessed by the other components of network environment 200 either directly or via network 210. In particular embodiments, social-networking system 260 may include an authorization server (or other suitable component(s)) that allows user 201 to opt in to or opt out of having their actions logged by social-networking system 260 or shared with other systems (e.g., third-party systems 270), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 260 through blocking, data hashing, anonymization, or other suitable techniques as appropriate. In particular embodiments, third-party system 270 may be a network-addressable computing system that can host media such as games playable by the user through the HMD. Third-party system 270 may generate, store, receive, and send media and user data, such as, for example, an initial download of a game itself, data used during gameplay, or information about the user playing the game, such as gaming progress, preferences, or patterns. The third-party system data generated, stored, received, and sent may be determined by preferences or privacy settings of the user stored as social-networking data in social-networking system 260. Third-party system 270 may be accessed by the other components of network environment 200 either directly or via network 210. In particular embodiments, one or more users 201 may use one or more main computer systems 230 to access, send data to, and receive data from social-networking system 260 or third-party system 270. Main computer system 230 may access social-networking system 260 or third-party system 270 directly, via network 210, or via a third-party system. As an example and not by way of limitation, main computer system 230 may access third-party system 270 via social-networking system 260. Main computer system 230 may be any suitable computing device, such as, for example, a personal computer, a laptop computer, a cellular telephone, a smartphone, a tablet computer, or an augmented/virtual reality device.

This disclosure contemplates any suitable network 210. As an example and not by way of limitation, one or more portions of network 210 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 210 may include one or more networks 210.

Links 250 may connect main computer system 230, social-networking system 260, and third-party system 270 to communication network 210 or to each other. This disclosure contemplates any suitable links 250. In particular embodiments, one or more links 250 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 250 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 250, or a combination of two or more such links 250. Links 250 need not necessarily be the same throughout network environment 200. One or more first links 250 may differ in one or more respects from one or more second links 250.

In the context of AR/VR, a user wearing an HMD may enter or virtually create a play space, or guardian, within which to interact with some specific media. For example, the user may play a game within the guardian. However, this guardian is only visible to the user wearing the HMD. Thus, other people, unable to see its virtual boundary, may inadvertently walk into the guardian. Additionally, during setup of the guardian, the user may not notice objects within or protruding into the guardian. Because these human or other intruders may pose a collision hazard to the user, there is a need to accurately detect their existence and location so as to warn the user of their presence.

Figure 3:
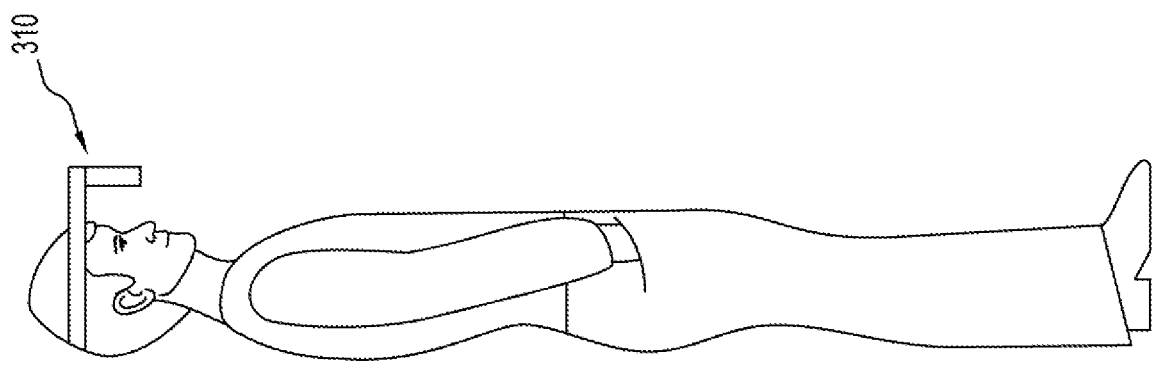
FIG. 3 illustrates an example HMD system wirelessly connected to a computer system.
Figure 3:
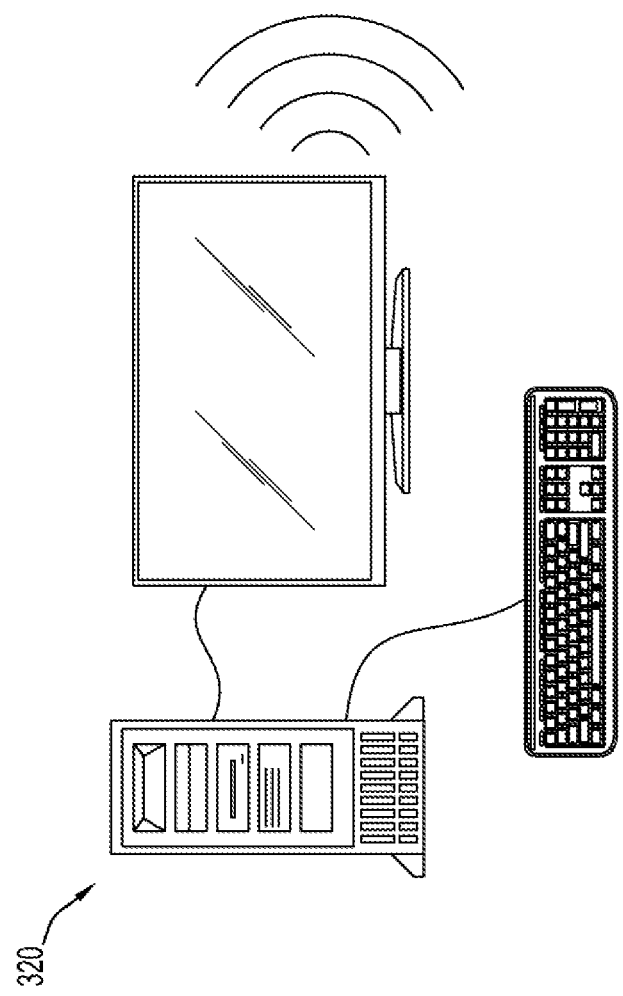

FIG. 3 illustrates an example HMD system 310 wirelessly connected to a computer system 320, such as main computer system 230 of FIG. 2. HMD 310 may comprise one or more displays, display engines, and computational resources. Main computer system 320, by contrast, may comprise more computational resources. In certain embodiments, main computer 320 may transmit each entire rendered frame to HMD 310 for display. In other embodiments, the HMD 310 itself may render frames locally. Though HMD 310 is illustrated as being connected to main computer system 320 wirelessly, this disclosure contemplates any suitable type of connection, including wired connections. Similarly, though a single HMD is shown connected to a single main computer system, this disclosure contemplates multiple HMDs connected to one or more main computer systems.

Figure 4A:
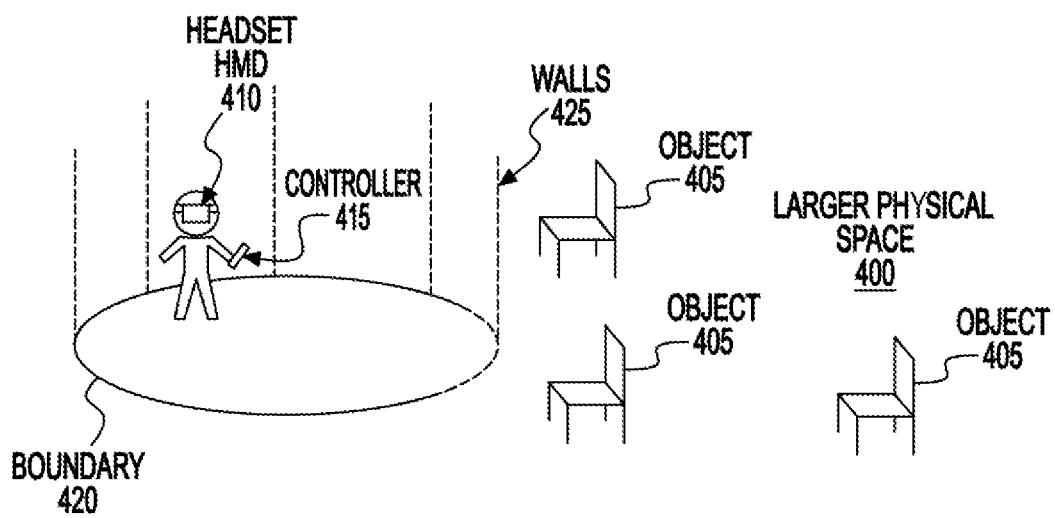
FIGS. 4A-4C illustrate examples of the creation of the boundary of a guardian surrounding a user.
Figure 4B:
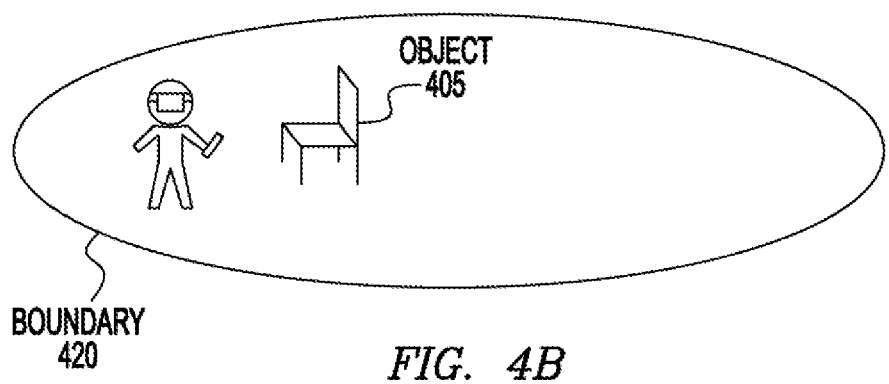
Figure 4C:
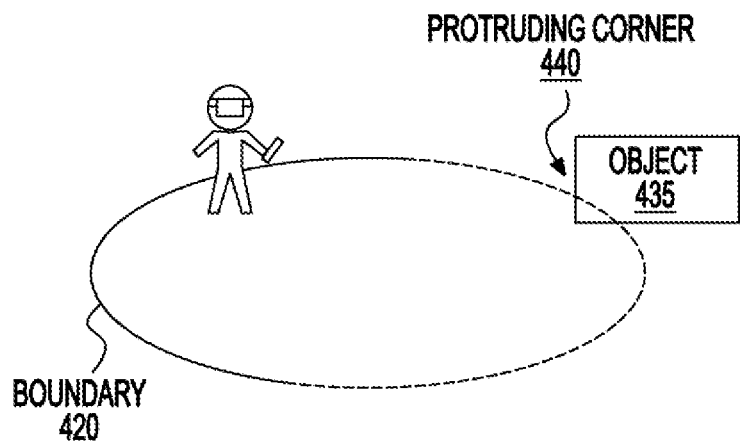

FIGS. 4A-4C illustrate examples of the creation of the boundary of a guardian surrounding a user. In FIG. 4A, a user wearing an HMD 410 is shown creating a guardian within a larger physical space 400 using hand gestures or a controller 415 that simulates, for example, a virtual laser pointer. As an example, a user drawing the boundary of this guardian may see the floor of the physical space as the bit map of an image, and draw the boundary on this bit map. During the actual drawing of the boundary, the user may see just the contour of the boundary, and when the boundary is closed, the space inside the guardian is shown in a particular color. The guardian should be devoid of any physical objects; this may allow the user to move freely around the guardian, for example, while wearing the HMD 410 and playing a video game. Thus, any physical objects 405 within the physical space 400 should be outside the boundary 420 of the guardian. Accordingly, visualizations of objects intersecting the boundary may be displayed to the user during the creation of the boundary. As an example, the visualizations may be presented to the user in a second color. Boundary 420 will then be vertically extruded upward to an appropriate height, creating virtual walls 425, so that a finished guardian virtually surrounds and encloses the user.

However, users are prone to errors when setting up guardians, and sometimes a physical object that could pose a collision hazard to the user may be included within the guardian. FIG. 4B illustrates an example in which a user has overlooked an object 405 within the guardian during creation of boundary 420. This oversight could occur for several reasons. For example, the object may be small and easily missed, or the user may be focused on creating the boundary of the guardian and may not be looking at its interior. This oversight may also occur if, rather than actively creating the boundary, the user simply instructs that a previously created boundary be recreated. As an example, the user may have taken a game system with the HMD to a new physical space, and simply instructed the system to start up using the same boundaries or guardian dimensions as a previous session. However, the user may not realize that an object in the new physical space has been included within this guardian. As another example, the user may restart the system in the original physical space 400 with the same guardian dimensions as a previous session, without realizing that an object, such as object 405, has been moved into the guardian since the time of that previous session.

FIG. 4C illustrates an example in which the boundary is still open, and a user drawing the boundary does not notice that an object 435 outside the boundary 420 will protrude into the guardian once the boundary is drawn. Accordingly, the user should be alerted to the presence of the portion 440 of object 435 within the guardian, either after the guardian is drawn or while the user is in the process of drawing the guardian, when the system detects that object 435 protrudes past the boundary 420 despite appearing to be outside the boundary. In certain embodiments, the system may detect this protrusion in real time, as the user actually draws the boundary up to and/or past the protruding portion 440. In other embodiments, the system may predict a likely location of an undrawn future portion of the boundary based on the user's position, movements, portions of the boundary that have already been drawn, and/or location or direction of the controller 415. Subsequently, the system may detect that the portion of the virtual object will intersect this predicted portion of the boundary. Accordingly, an alert indicating the portion of the virtual object may be provided to the user. Such an alert may include a visualization of the protruding portion 440 and/or haptic feedback. The user may then move the object 435 or be provided with tools to override the alert or to adjust the guardian boundary 420.

Once created, the guardian may be validated and checked for any included objects or portions of objects, and then continuously monitored to detect any new intruders.

Figure 5:
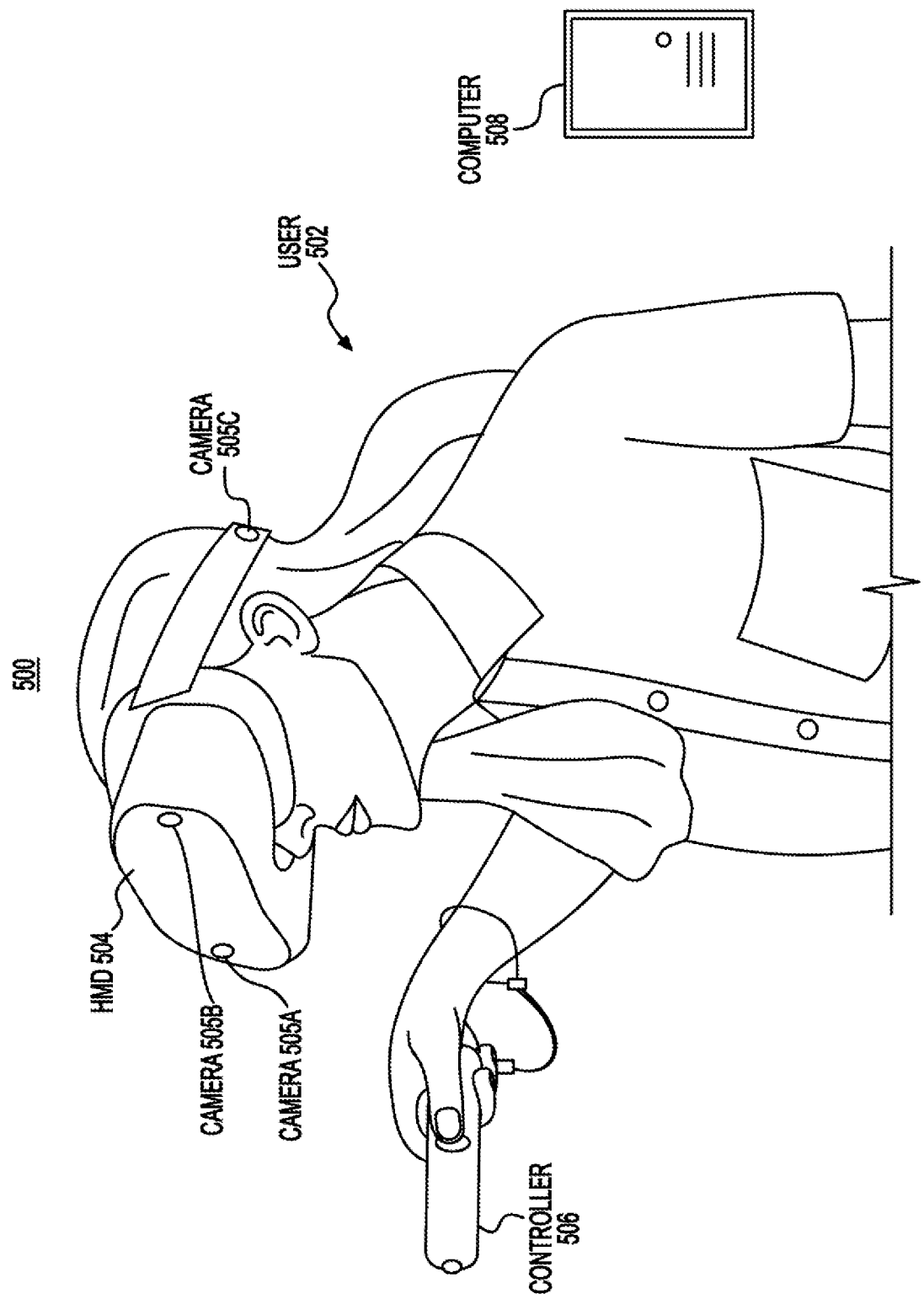
FIG. 5 illustrates an example HMD.

FIG. 5 illustrates an example HMD 504. In particular embodiments, this HMD 504 may be an AR/VR HMD worn by a user 502 within an AR/VR system 500. In particular embodiments, the AR/VR system 500 may comprise the HMD 504, a controller 506, and a computing system 508. The HMD 504 may be worn over the user's eyes and provide visual content to the user 502 through internal displays (not shown). The HMD 504 may have two separate internal displays, one for each eye of the user 502. As illustrated in FIG. 5, the HMD 504 may completely cover the user's field of view. By being the exclusive provider of visual information to the user 502, the HMD 504 achieves the goal of providing an immersive virtual reality experience. One consequence of this, however, is that the user 502 cannot see the physical environment surrounding him when immersed in the virtual reality media, as his vision is shielded by the HMD 504. As such, the intrusion detection described herein is needed to provide the user with real-time visual information about his physical surroundings.

The HMD 504 may have external-facing cameras, such as four cameras 505A, 505B, 505C, and 505D (not shown) arranged around the HMD in FIG. 5. While only four cameras 505A-505D are described, the HMD 504 may have any number of cameras facing any direction (e.g., an upward-facing camera to capture the ceiling or room lighting, a downward-facing camera to capture a portion of the user's face and/or body, additional forward- or backward-facing cameras, and/or an internal camera for capturing the user's eye gaze for eye-tracking purposes). The external-facing cameras are configured to capture the physical environment around the user and may do so continuously to generate a sequence of frames (e.g., as a video).

The captured frames may be processed to generate depth measurements of physical objects observed by the cameras 505A-505D. Depth may be measured in a variety of ways. In particular embodiments, depth may be computed based on stereo images. For example, pairs of cameras among cameras 505A-505D may share an overlapping field of view and be configured to capture images simultaneously. As a result, the same physical object may be captured by both cameras in a pair at the same time. For example, a particular feature of an object may appear at one pixel $p_A$ in the image captured by camera 505A, and the same feature may appear at another pixel $p_B$ in the image captured by camera 505B. As long as the depth measurement system knows that the two pixels correspond to the same feature, it may use triangulation techniques to compute the depth of the observed feature. For example, based on the camera 505A's position within a 3D space and the pixel location of $p_A$ relative to the camera 505A's field of view, a line could be projected from the camera 505A and through the pixel $p_A$. A similar line could be projected from the other camera 505B and through the pixel $p_B$. Since both pixels correspond to the same physical feature, the two lines intersect. The two intersecting lines and an imaginary line drawn between the two cameras 505A and 505B form a triangle, which may be used to compute the distance of the observed feature from either camera 505A or 505B or a point in space where the observed feature is located.

In particular embodiments, these depth measurements may be used to create a depth map of the physical space. Such a depth map may be densified, as the stereo points generated through the above process may be sparse and concentrated on edges and textured areas of the physical objects. Densification may augment the depth map with additional points by interpolating and extrapolating these sparse stereo points. Such augmentation may assist in obtaining an accurate reconstruction of textureless surfaces, such as white walls or desktops, that may otherwise be only sparsely detected.

In particular embodiments, the pose (e.g., position and orientation) of the HMD 504 within the environment may be needed. For example, in order to render the appropriate display for the user 502 while he is moving about in a virtual environment, the system 500 would need to determine his position and orientation at any moment. Based on the pose of the HMD, the system 500 may further determine the viewpoint of any of the cameras 505A-505D or either of the user's eyes. In particular embodiments, the HMD 504 may be equipped with inertial-measurement units ("IMUs"). The data generated by the IMUs, along with the stereo imagery captured by the external-facing cameras, allow the system 500 to compute the pose of the HMD 504 using, for example, SLAM (simultaneous localization and mapping) or other suitable techniques.

In particular embodiments, the artificial reality system 500 may further have one or more controllers 506 that enable the user 502 to provide inputs. The controller 506 may communicate with the HMD 504 or a separate computing unit 508 via a wireless or wired connection. The controller 506 may have any number of buttons or other mechanical input mechanisms. In addition, the controller 506 may have an IMU so that the position of the controller 506 may be tracked. The controller 506 may further be tracked based on predetermined patterns on the controller. For example, the controller 506 may have several infrared LEDs or other known observable features that collectively form a predetermined pattern. Using a sensor or camera, the system 500 may be able to capture an image of the predetermined pattern on the controller. Based on the observed orientation of those patterns, the system may compute the controller's position and orientation relative to the sensor or camera.

The artificial reality system 500 may further include a computer unit 508. The computer unit may be a stand-alone unit that is physically separate from the HMD 504 or it may be integrated with the HMD 504. In embodiments where the computer 508 is a separate unit, it may be communicatively coupled to the HMD 504 via a wireless or wired link. The computer 508 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that may be practical to use on an AR/VR system 500 may be based on the capabilities of its computer unit 508.

Figure 6:
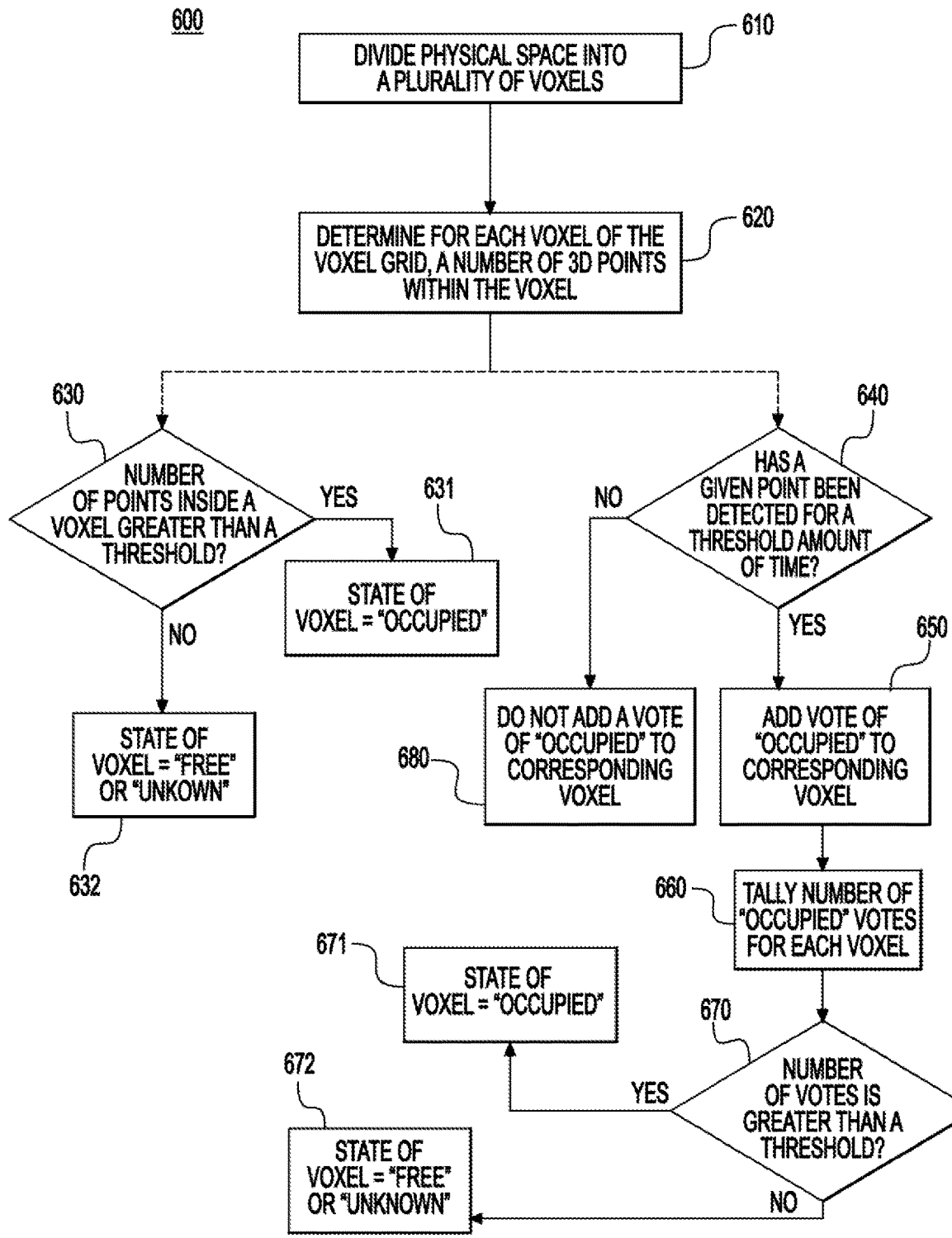
FIG. 6 illustrates an example method for determining the occupancy states of voxels.

FIG. 6 illustrates an example method 600 for determining the occupancy states of voxels. Depth measurements of physical objects generated based on images can be imprecise, particularly as the distance from the cameras increases. As a result, the 3D points obtained through this process may be noisy and unreliable. To improve the reliability of the data gathered, a quantity and/or temporal consistency of detected 3D points may be considered. Method 600 may begin at step 610, in which physical space 400 is divided into a plurality of voxels, creating a voxel grid. Each voxel may have a given size (for example, 10 cm×10 cm, 20 cm×33 cm, etc.), and the size or resolution of the voxels may depend on factors such as memory or processing restraints of the AR/VR system, or a desired level of precision in object detection. Each voxel further has a state that could be, e.g., free, occupied, or unknown; at setup, all voxels may start with a state of unknown.

In particular embodiments, each of the 3D points in the point cloud falls into one voxel in the voxel grid and a voxel may contain many 3D points. Each 3D point corresponds to a potential detected object or feature in the physical space, and each point counts as a vote that its corresponding voxel is occupied. If a given voxel contains enough points, or votes, within it, then the system may have more confidence that the points correspond to one or more actual physical objects within the voxel, rather than merely noise. However, each voxel may be relatively large, and thousands of 3D points may be generated within each frame, many of which will be positioned very close to one another. Accordingly, a refiltering stage may be performed, in which nearby points within a given voxel are bundled together. As an example, if a first voxel contains 15 points, these points may be bundled and treated as a single point, with a weight of 15. This bundled point may contribute a weighted vote to the occupancy state of its corresponding voxel, as described below with respect to FIG. 7.

At step 620, a number of points within each voxel of the voxel grid is determined. At step 630, the method determines whether the points within each voxel satisfy one or more threshold criteria (e.g., if the number of points within the threshold is greater than a predefined number, such as 3, 5, 10, etc.). In particular embodiments, the threshold criteria may be uniformly applied across the voxel grid. In other embodiments, different voxels may use different threshold criteria (e.g., the threshold could be a function of distance between the voxel and the user, such that voxels that are farther away have higher threshold requirements than closer voxels). If the threshold criteria are satisfied, the method proceeds to step 631, in which a state of the voxel is updated to "occupied". A greater number of points within a voxel indicates a higher likelihood that the points accurately correspond to an object, whereas if only one or a few points are detected, there may be a higher likelihood that the points are just noise. Similarly, many points clustered densely together indicates a higher likelihood that they accurately correspond to a detected object, whereas if only a few scattered points are detected, there may be a higher likelihood that the points are just noise. If the number of points within a voxel is not greater than the threshold, the method proceeds to step 632, in which the state of the voxel is further assessed to determine whether it should be either "free" or "unknown".

Additionally or alternatively to step 630, step 640 may be performed. At step 640, the method determines, for each of the detected points of each voxel, whether the point has been detected for a threshold amount of time or a threshold number of frames. If a point has not been detected for a threshold amount of time, the method proceeds to step 680, in which the point is ignored, and no vote for "occupied" is added to the corresponding voxel. On the other hand, if a point is detected for a threshold amount of time, the method proceeds to step 650, in which a vote of "occupied" is added to the voxel containing the point. The longer a point has been detected, the greater the likelihood that it accurately corresponds to an object. For example, if a point is only detected for a brief amount of time, or if it flashes in and out of existence over a series of frames, it is likely to be just noise; on the other hand, if a point is detected and remains consistently detected for a certain amount of time, it likely corresponds to an actual detected object. Thus, the consistency in which a point is observed over time may be used to weigh the vote of that point. In particular embodiments, detected points may be filtered by being projected into past images or frames. As an example, a point that has been consistently observed in the past five frames may be weighted more than a point that is observed in only the current frame. The method then proceeds to step 660, in which a number of "occupied" votes are tallied for each voxel.

At step 670, it is determined whether the tallied number of votes is greater than a threshold. If so, the method proceeds to step 671, in which the state of the corresponding voxel is set to "occupied"; otherwise, the method proceeds to step 672, in which the state of the voxel is further assessed to determine whether it should be "free" or "unknown".

Either or both of the considerations of point density, as described with respect to steps 630-632, and temporal consistency, as described with respect to steps 640-680, may be used when determining the state of a voxel, depending on factors such as the processing resource consumption and capabilities of the AR/VR system.

In particular embodiments, once voxels have been assigned their states, the system may detect a number of contiguous voxels having states of "occupied". If more than a threshold number of contiguous voxels are occupied, the system may determine that there is sufficient evidence that an actual object(s) is at the location of these adjoining voxels. Additionally, temporal decay may be considered in the detection of an object. For instance, if a voxel becomes occupied but adjoining voxels do not, after a certain amount of time, the state of the voxel may be set to "free" or "unknown", as it is less likely that an object will occupy only a single voxel. If, on the other hand, a voxel becomes occupied for less than a threshold amount of time, but adjoining voxels are also occupied, the system may determine that an object is present and moving through the locations of the occupied voxels.

Figure 7:
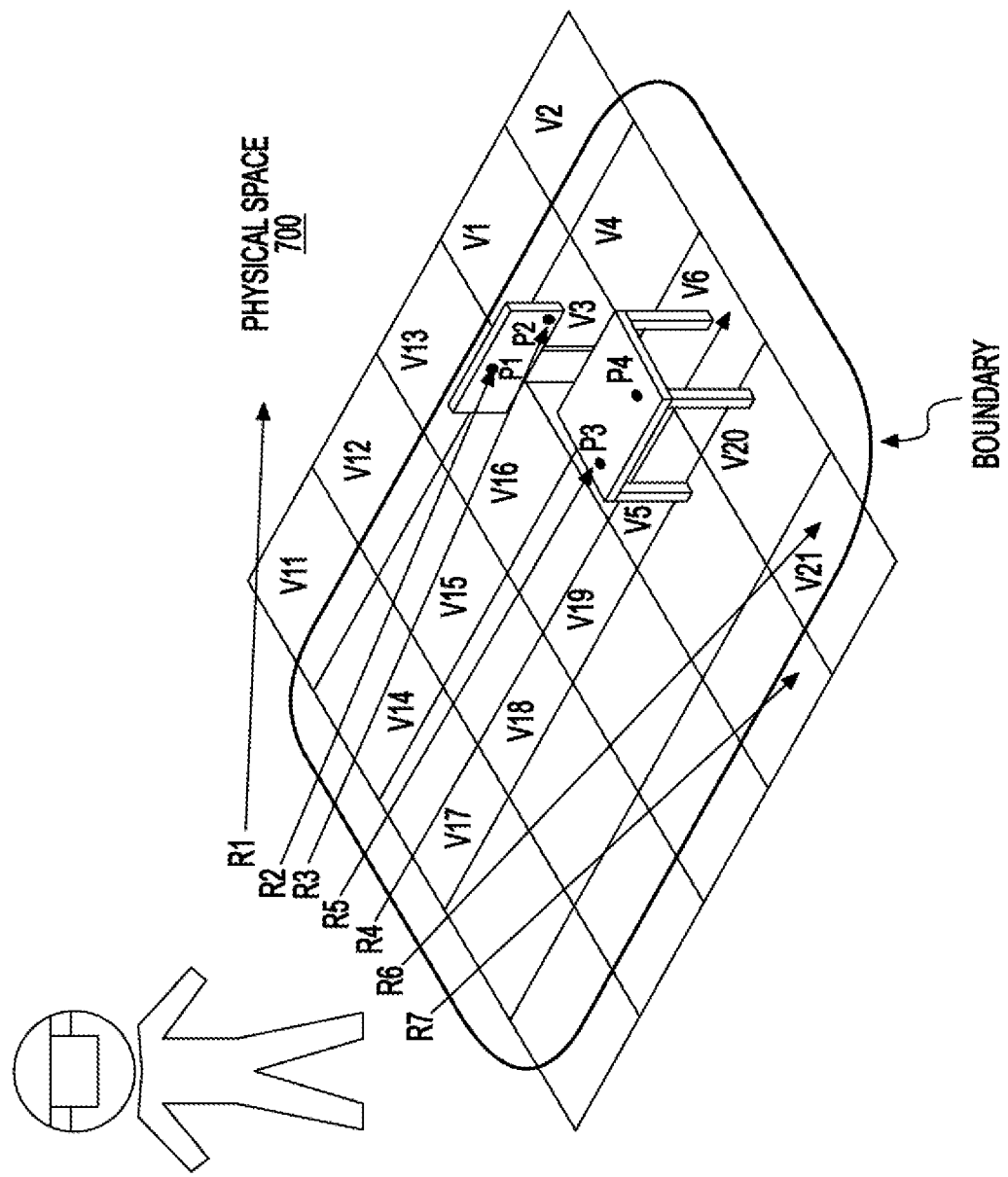
FIG. 7 illustrates an example process of ray-casting to determine free voxels.

FIG. 7 illustrates an example process of ray-casting to determine free voxels. The system may determine the states of other voxels in the voxel grid by casting rays (e.g., R1-R7) from the viewpoint of the HMD into the physical space 700 towards the points in the point cloud. As previously described, a point that is within a voxel counts as a vote toward that voxel being occupied. For example, points P1, P2, and P3 in voxels v3, v3, and v5, respectively, count as "occupied" votes. Accordingly, voxel v3 will receive two votes for "occupied", and voxel v5 will receive one vote. Meanwhile, voxels between the HMD and each of the points that are intersected by the rays are given a vote of "free", because space between the HMD and an intersected point should be empty. For example, ray R3 intersects voxels v14, v15, and v16 before it reaches the voxel v3 in which the target point P2 lies. As such, voxels v14, v15, and v16 each receive one "free" vote. Based on the votes, the system could treat a voxel as being occupied, free, or unknown. For example, if the "free" votes of a voxel significantly outnumber the voxel's "occupied" votes, then the voxel could be treated as being "free." If the "occupied" votes significantly outnumber the "free" votes, the voxel could be treated as being "occupied." If the difference between the "free" and "occupied" votes is insignificant, then the state of the voxel could be deemed "unknown." For example, in particular embodiments, a numeric value may represent the tallied vote count for each voxel. Each "occupied" vote may increase that value by a particular amount (e.g., 1), and each "free" vote may decrease the value by the particular amount. Thus, after the votes are tallied, the numeric value may be negative, positive, or zero. In particular embodiments, the numeric value may have a predefined range (e.g., −10 to +10). One subrange (e.g., +3 to +10) may correspond to a state of "occupied," a second subrange (e.g., −3 to −10) may correspond to a state of "free," and a third subrange (e.g., −2 to 2) may correspond to a state of "unknown." A voxel having the state of "occupied" suggests that the voxel likely contains a physical object.

However, voxels must be able to update their occupancy states dynamically as the environment changes and object detection proceeds, and allowing the numeric value of a voxel to exceed certain thresholds may result in a value so great that additional voting cannot change its state within an acceptable time frame. Accordingly, each voxel may have a minimum and a maximum value (in the example above, the minimum value may be −10 while the maximum value may be 10). Each point, or vote, within a voxel may further have a set lifespan, and as that lifespan expires, the votes within the voxel may decrease. Thus, over time, the occupancy state of the voxel may change from "occupied" to "unknown", as described below with respect to FIG. 10.

In particular embodiments, each voxel may store a floating point value, with the state of a voxel corresponding to a given subrange of values, as discussed above. Each point within a voxel contributes a vote (which could be weighted) to the state of the voxel being occupied; however, not all votes may be given the same weight. For example, a noise model may be used to weight the value of a point based on its distance from the cameras of the HMD. With stereo reconstruction, the detection of points becomes less precise and less reliable as the distance between the point and the cameras increases. Thus, distant points may be given less weight than closer points when tallying votes for a given voxel.

When an object poses a hazard to the user, a visual and/or audio alert may be issued to the user to indicate the presence and/or location of the object. However, these hazardous objects are generally ones that are within the guardian, as the user expects the space within the guardian boundary to be safe (e.g., free of obstacles) and objects outside of the guardian may not be close enough to the user to pose a danger. Accordingly, in particular embodiments, a distinction may be made between occupied voxels within the guardian and those outside the guardian. When the physical space is divided into the voxel grid, locations of voxels may be compared to the location of the boundary of the guardian. Voxels deemed to be "occupied" within the boundary may trigger an alert and voxels beyond that boundary may be ignored.

In particular embodiments, within the guardian, distance ranges may be set to control when it is appropriate to issue an alert to the user for a detected intruder. For example, even if an intruder is within the guardian, it may be far enough away from the user as to not pose a risk. For instance, an intruder such as a person or pet may pass quickly through a portion of the guardian that is distant enough (e.g., 10, 12, 15 meters) from the user or brief enough (e.g., 1 or less than 1 second) so as not to impede his movements during, for example, playing a game. In such a case, it may not be necessary or desirable to interrupt the game.

Similarly, a threshold distance may be set surrounding the user, and objects close to the user within that threshold distance may not cause an alert to be issued. This may prevent, for example, an alert being issued in response to movement of the user's own arms or legs. The size of the threshold distance may be determined in several ways. As an example, it may simply be a set predetermined size. As another example, the threshold may be based on detection of a controller held by the user, and distance within which to ignore detected objects may be a function of how close to the body the user is holding the controller (because an object within this distance is likely to be either a part of the user's body or something that the user is deliberately touching). Another option to avoid issuing an alert for movements of the user himself is to perform body tracking of the user.

Figure 8A:
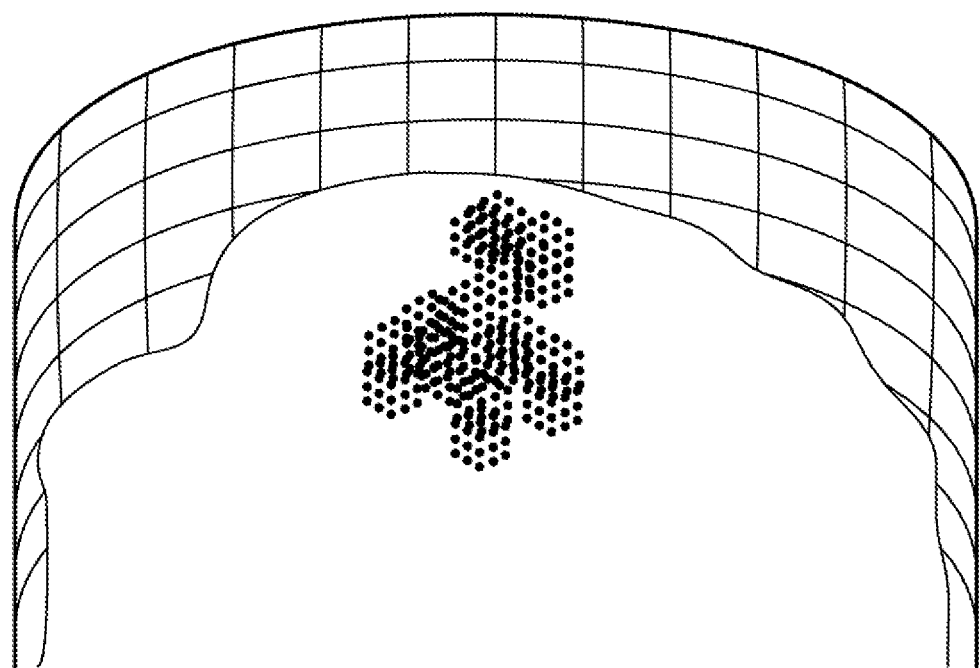
FIGS. 8A-8C illustrate example visualizations presented to a user of physical objects left within a guardian during setup of the guardian.
Figure 8B:
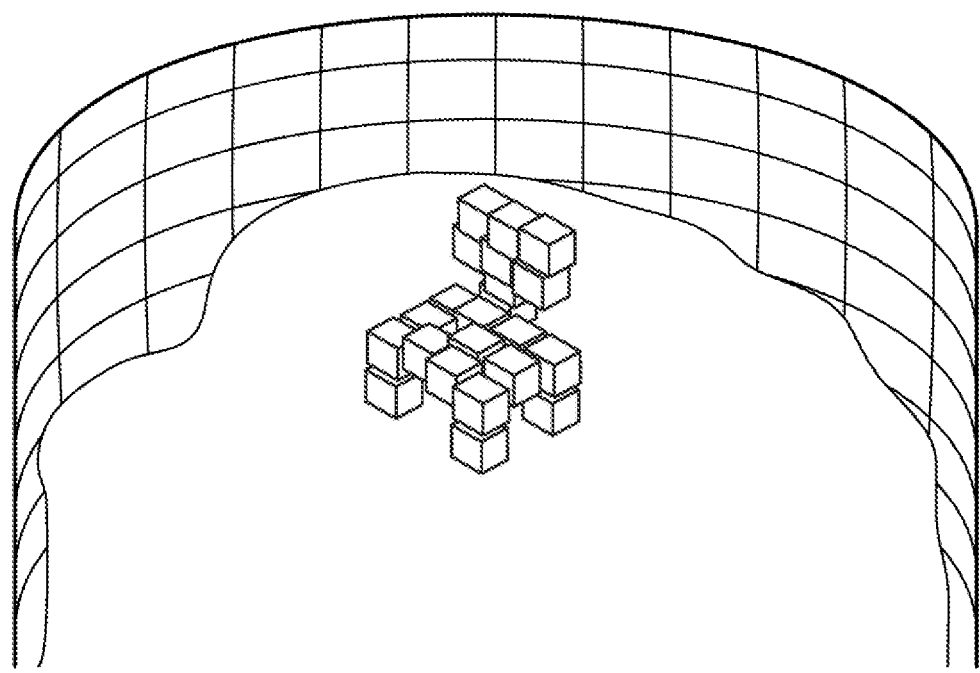
Figure 8C:
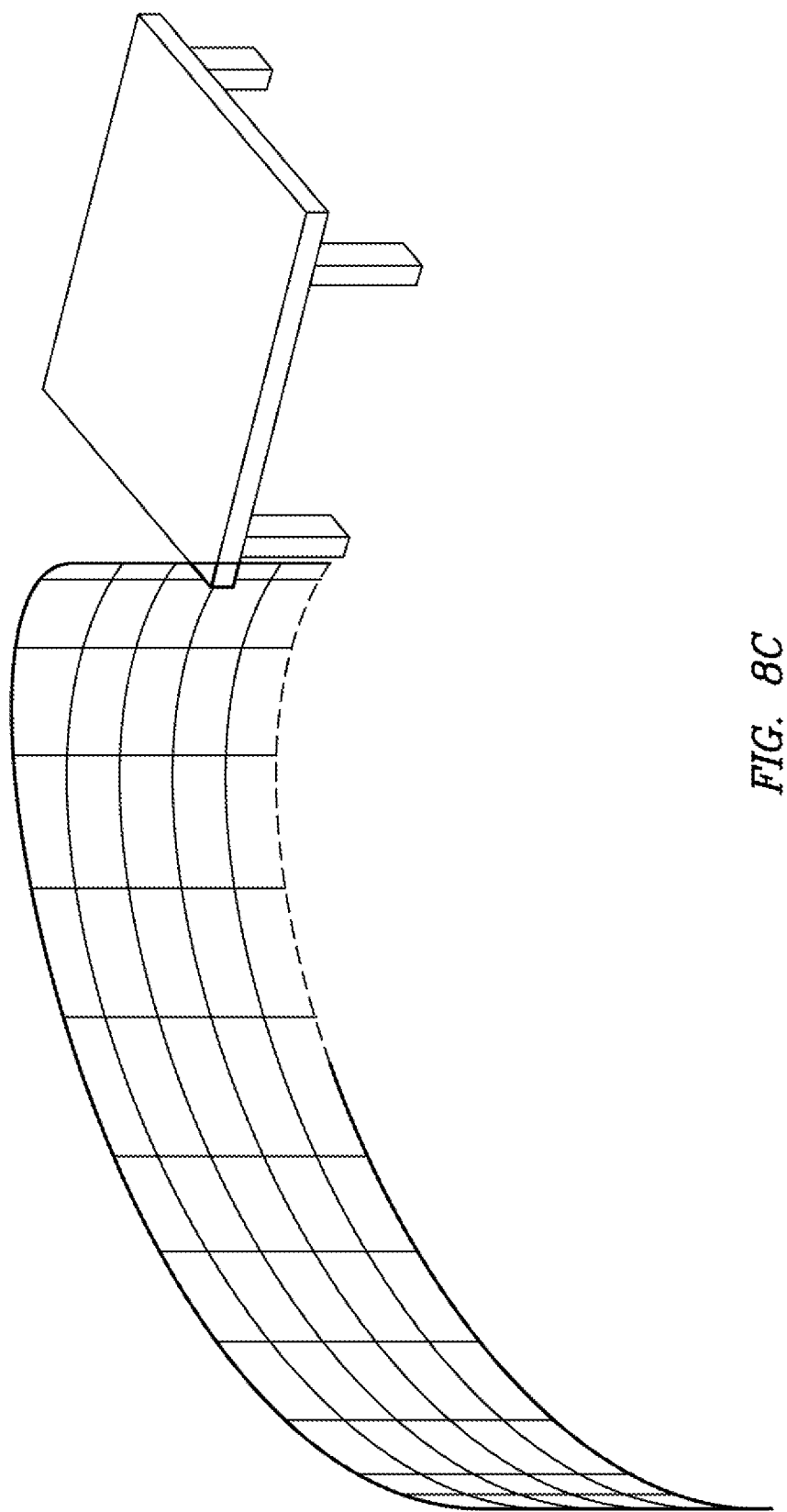

FIGS. 8A-8C illustrate example visualizations presented to a user of physical objects left within a guardian during setup of the guardian. Once the system has detected an intruder and determined that alert should be issued, many options exist as to the nature or properties of that alert. Particular visualization or audio techniques may be based on, for example, which voxels are actually occupied, when they are detected, or on properties of the media being viewed by the user through the HMD. As an example, as illustrated in FIG. 8A, a detected intruder, such as a chair, may be displayed to the user as a point cloud. As another example, FIG. 8B illustrates a detected object displayed as a visualization of the actual occupied voxels themselves. As yet another example, as illustrated in FIG. 8C, an intruder such as the corner of a table that protrudes into the guardian, or that is predicted to be likely to protrude into the guardian once the boundary has been completely drawn, may be outlined to bring it to the attention of the user. When the user is in the initial setup of the guardian or drawing the boundary, the HMD is operating in mixed-reality mode, or in a mode of VR in which a visualization of the real world (e.g., based on 3D reconstruction techniques) is presented to the user in as close to real time as possible. Accordingly, presentation of detected intruders as simply points, voxels, or lines may be helpful in bringing them to the attention of the user without consuming too much processing power. Additionally, in a situation where the AR-type display shows the surrounding physical space in greyscale, adding color to the displayed visual alert may further attract the user's attention.

FIGS. 9A-9D illustrate example visualizations 900 of a user drawing a boundary that intersects various objects in the user's environment. Users often tend to draw boundaries through objects that intrude into the actual available guardian (for example, under chairs or tables, on walls, and through boxes). In addition to simply overlooking objects that intrude into the guardian, users may consciously draw through such objects for many reasons, such as attempting to maximize smaller play spaces, making a judgement that objects are soft/less harmful and therefore pose minimal risk if they are included within the guardian, underestimating the possibility that the object may interfere in the guardian during a game, or being unable to actually move the object. Accordingly, users may either be encouraged to improve the safety of the guardian (for example, by removing an intruding object or redrawing the boundary), or they may be made constantly aware of an object that remains intruding into the guardian (for example, if the object is immovable).

Figure 9A:
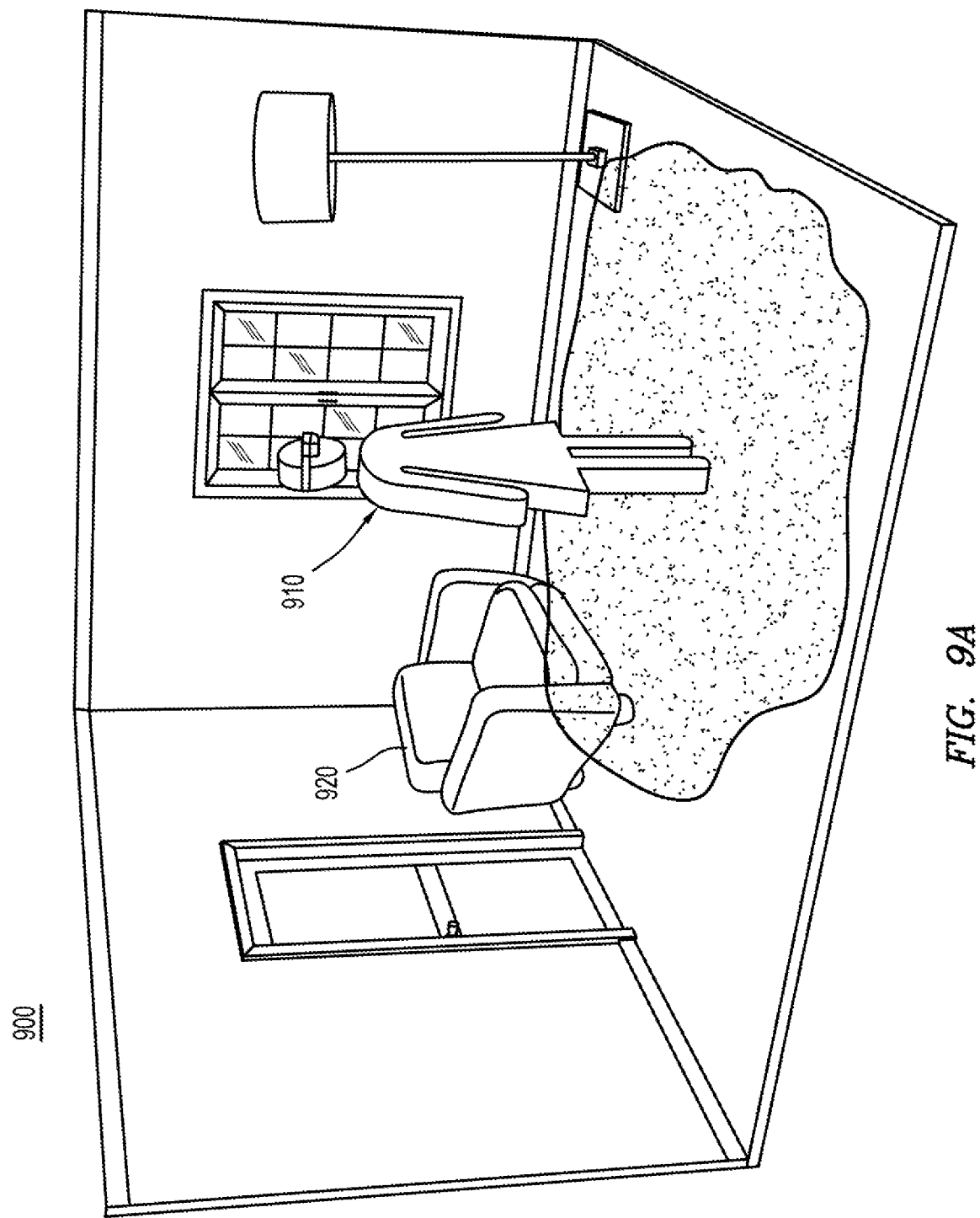
FIGS. 9A-9D illustrate example visualizations of a user drawing a boundary that intersects various objects in the user's environment.

FIG. 9A illustrates an example situation 900 in which a user 910 has unknowingly included a portion of an object within the guardian. User 910 has drawn a large guardian boundary that covers most of the room, extending all the way to the edges of the walls. However, the user drew the boundary while facing forward, and thus drew through chair 920 behind the user. Chair 920 is outside the field of view when creating the boundary, and was thus inadvertently included within the guardian; chair 920 may additionally remain outside the field of view while the user is immersed in VR media, and the user 910 may collide with chair 920 if they move backwards. Accordingly, an alert may be issued to the user 910 alerting them to the presence of an object behind them within their guardian. The user 910 may further be provided with tools to address this alert, such as an option to edit the boundary to exclude chair 920, an option to redraw the boundary from scratch, or an option to override the alert. In particular embodiments, the system may receive, in response to the alert, a second input from the user indicating a revised boundary that excludes a portion of the virtual object representing the physical object from the subspace/guardian.

Figure 9B:
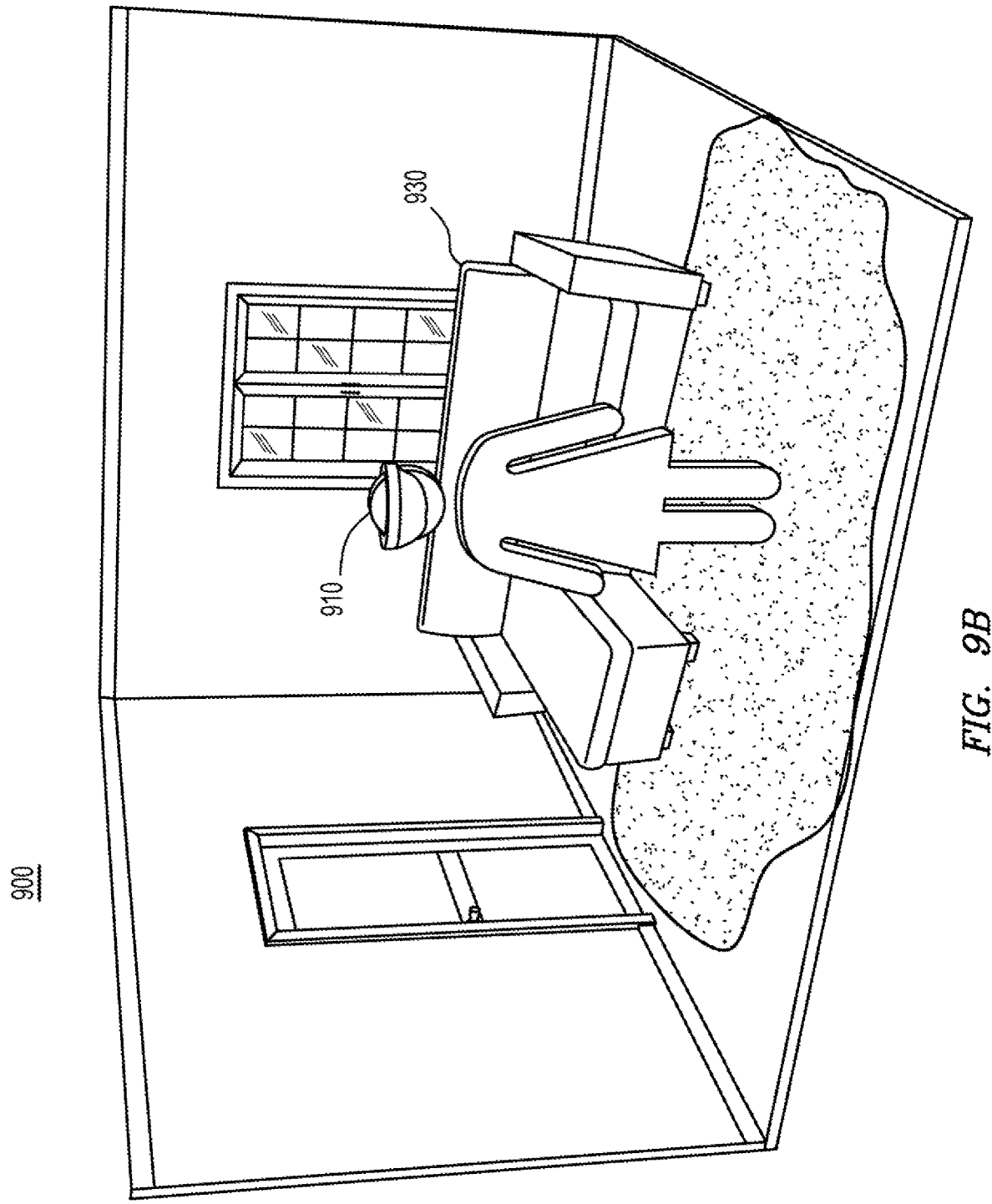

FIG. 9B illustrates an example situation 900 in which a user 910 has knowingly included a portion of an object within the guardian. User 910 is aware that a portion of sofa 930 intrudes into their guardian. However, the sofa 930 may be hard to move, and the guardian may already be drawn to include as much space is available. Accordingly, user 910 may appreciate an option to be able to exclude such an entity that occupies space and volume from their guardian boundary. Thus, the intrusion detection system may provide the user with tools or suggestions for adjusting the boundary of the guardian in a way that excludes sofa 930. An alert indicating the presence of sofa 930 may be issued to the user. As an example, this alert may illustrate a region intersecting the sofa 930 in a particular color (e.g., red) to indicate that the boundary should be retracted in this location, and a tool may correspondingly be provided to allow user 910 to erase a part of the boundary that intersects with sofa 930 and redraw that portion to be fully in front of sofa 930, such that sofa 930 no longer intersects the boundary.

Figure 9C:
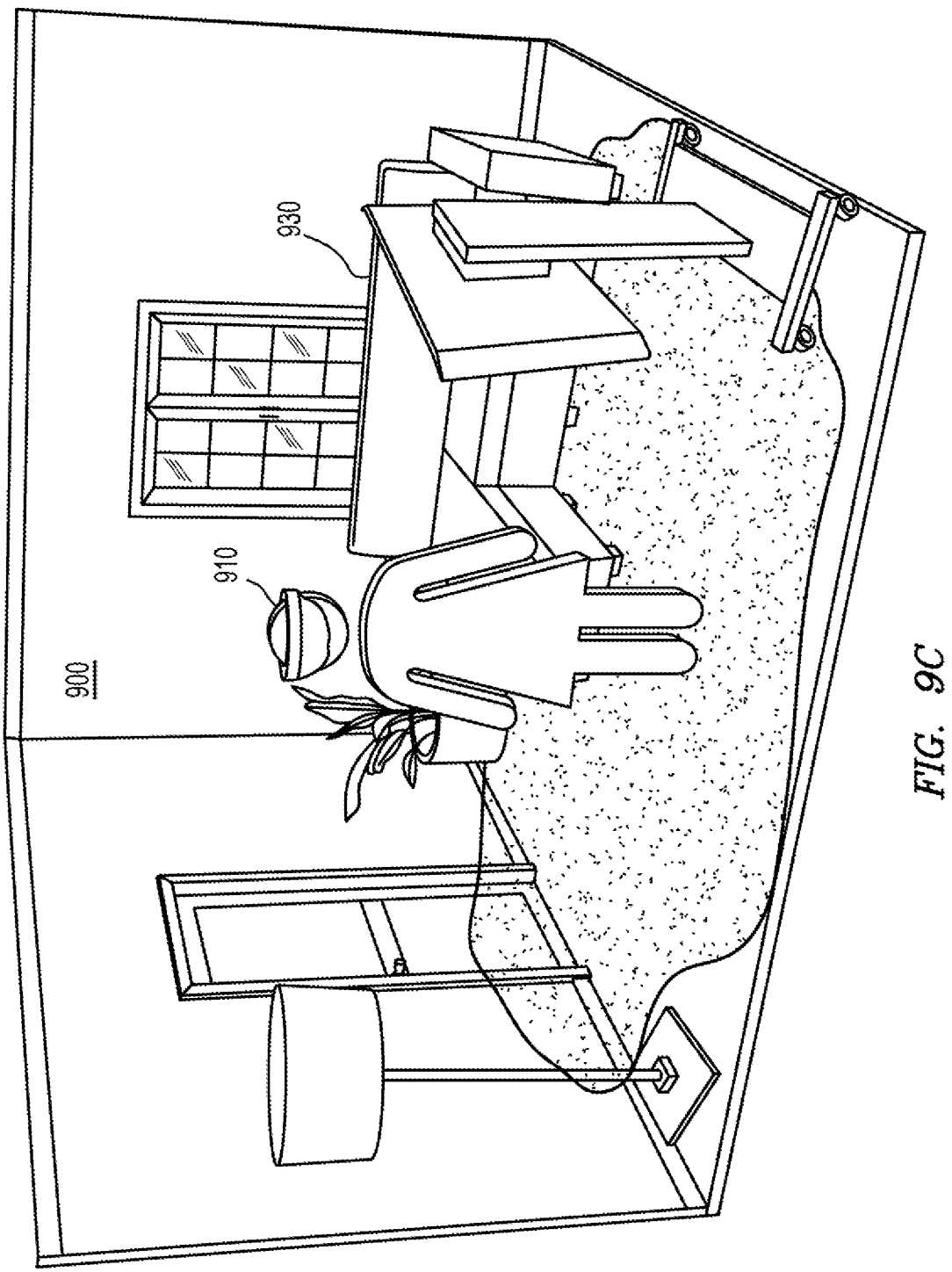

FIG. 9C illustrates an example situation 900 in which, in an attempt to maximize available play space within the guardian, a user 910 has additionally drawn through the walls of the larger physical space. Because such walls may be relatively featureless (e.g., plain white walls), the intrusion detection system may use textured light in order to detect that such a wall intersects the boundary of the guardian. Using an infrared projector, structured light may be projected onto surfaces, such as the wall, in order to detect their presence and intrusion into the guardian. The user 910 may then be provided with tools to adjust the boundary or override the alert.

Figure 9D:
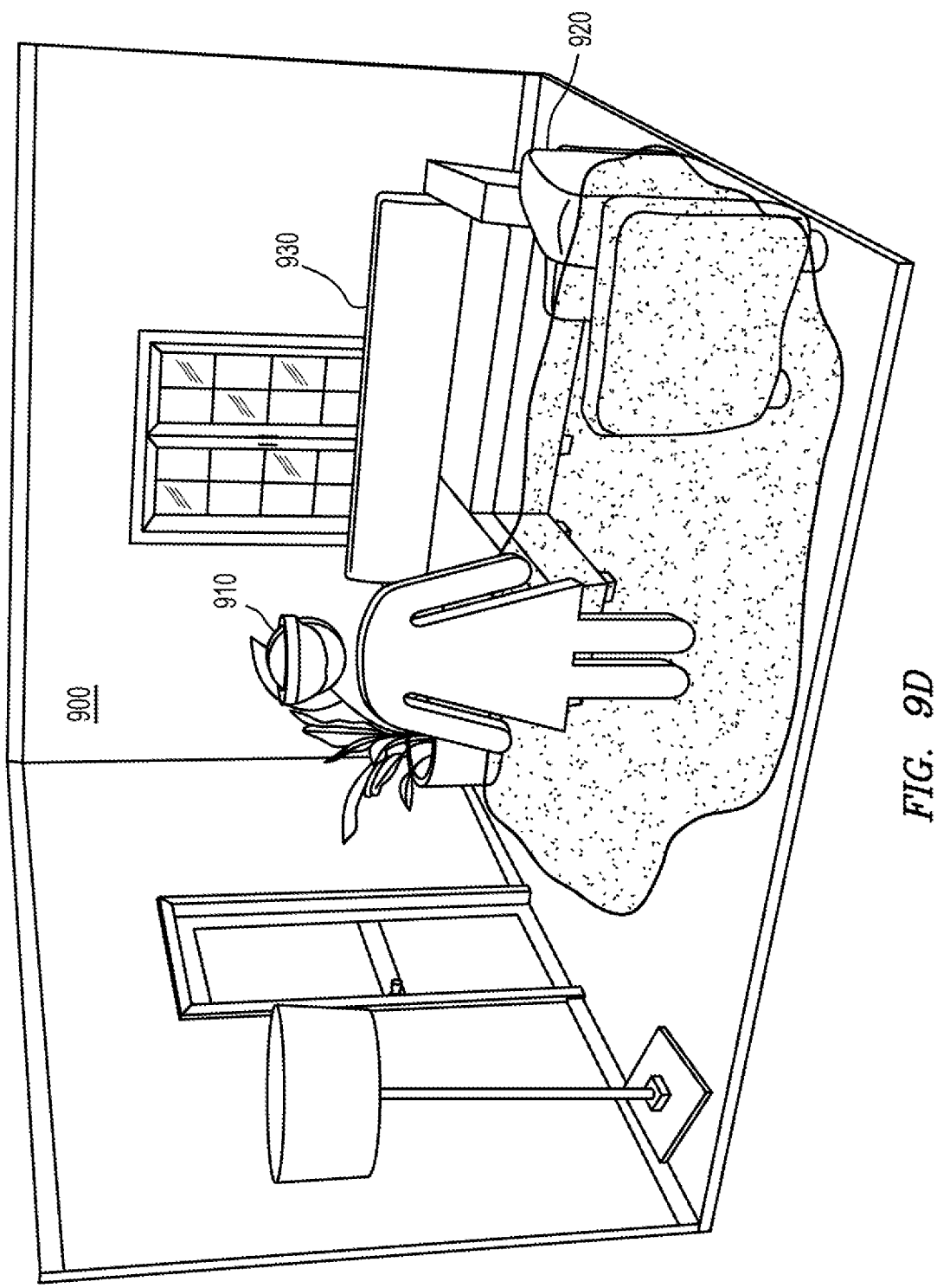

FIG. 9D illustrates an example situation 900 in which a user 910 has knowingly included portions of objects within the guardian, and finds their presence acceptable. As illustrated, user 910 has drawn the boundary of the guardian through chair 920 and sofa 930. However, if the immersive media the user is viewing is something considered stationary, such as a game that does not involve much movement, they may have underestimated the extent to which chair 920 will intrude into their guardian. In addition, due to the nature of the object (for example, the soft cushions of sofa 930), user may have assumed that sofa 930 would cause little harm. In this case, the user 910 may appreciate having an option to override the alert, and to maintain the guardian as currently drawn. Depending on the nature of the media or game being played by the user, the presence of these objects 920 and 930 may be acceptable within the guardian. As an example, if the user 910 is playing a game that involves a lot of arm movement but not much walking, the intrusion detection system may determine whether an object is tall enough to be considered an obstacle for the user's body but not his hands, and may determine that the presence of shorter objects such as sofa 930 may not impede the user's game or safety. The user 910 may move or wave their arms over sofa 930; however, if the user 910 begins to walk toward sofa 930, the system may issue an alert reminding the user that there is an obstacle near their feet. As an example, the system may determine a distance between the user and this intruding portion of sofa 930, and issue an alert to the user if that distance becomes less than a threshold. This alert may include a visualization of sofa 930, or an alert indicating the distance between the user 910 and the sofa 930.

Once the intrusion detection system has detected intruding objects, it may provide the user with an alert and/or suggestions to move any detected objects. The system may then detect, in response to the alert/suggestions, a user movement of the physical object to a new location outside the boundary. As an example, if the user chooses to move the objects rather than re-draw the boundary or override the alert, the system may confirm with the user that the object has been moved outside the boundary, and may warn the user if the object is still within the boundary before allowing entry into a VR mode. In particular embodiments, an intruding object will not be tracked once it has left the boundary, either by being moved or by being excluded from the boundary through editing of the boundary by the user.

Edits to the boundary and/or particular detected objects may be remembered by the system for future sessions. As an example, adjustments to the shape or size of the guardian may be saved, and this edited boundary may be automatically re-created in a future session upon system startup. Additionally, intruding objects from previous sessions may be remembered if the intrusion detection system detected the intruding object, but the user proceeded with the VR media without moving the object or adjusting the boundary (by contrast, if the user did move the object in the previous session, there may be no need to remember the object position from that last session). In a future session, if the user is looking in the direction of this remembered intruding object, the system may assume that the object is still there, and may check to see if this assumption is correct. If the object is detected again, a new alert may be issued to the user. If the user is not looking in the direction of the remembered object, the system may not be able to detect the object, and thus may ignore it. Additionally or alternatively, if this remembered object is within the user's field of view, and is thus detectable, an alert may be issued to the user; if the remembered object is not within the user's field of view, the system may prompt the user to turn and look in the direction of the remembered object, in order for the system to determine whether the object is still there.

In particular embodiments, the system may further recommend optimizations of the guardian to a user once the boundary has been drawn. As an example, the system may determine which areas of the larger physical space are free and which are occupied, rather than only considering areas within the guardian. If it is determined that additional space exists, the system may suggest that the user expand the boundary of the guardian, thus aiding the user in creating an even larger playspace. As discussed above, the system may use structured light projected into the physical space to distinguish areas that are free from areas that are featureless but occupied (such as white walls).

Figure 10:
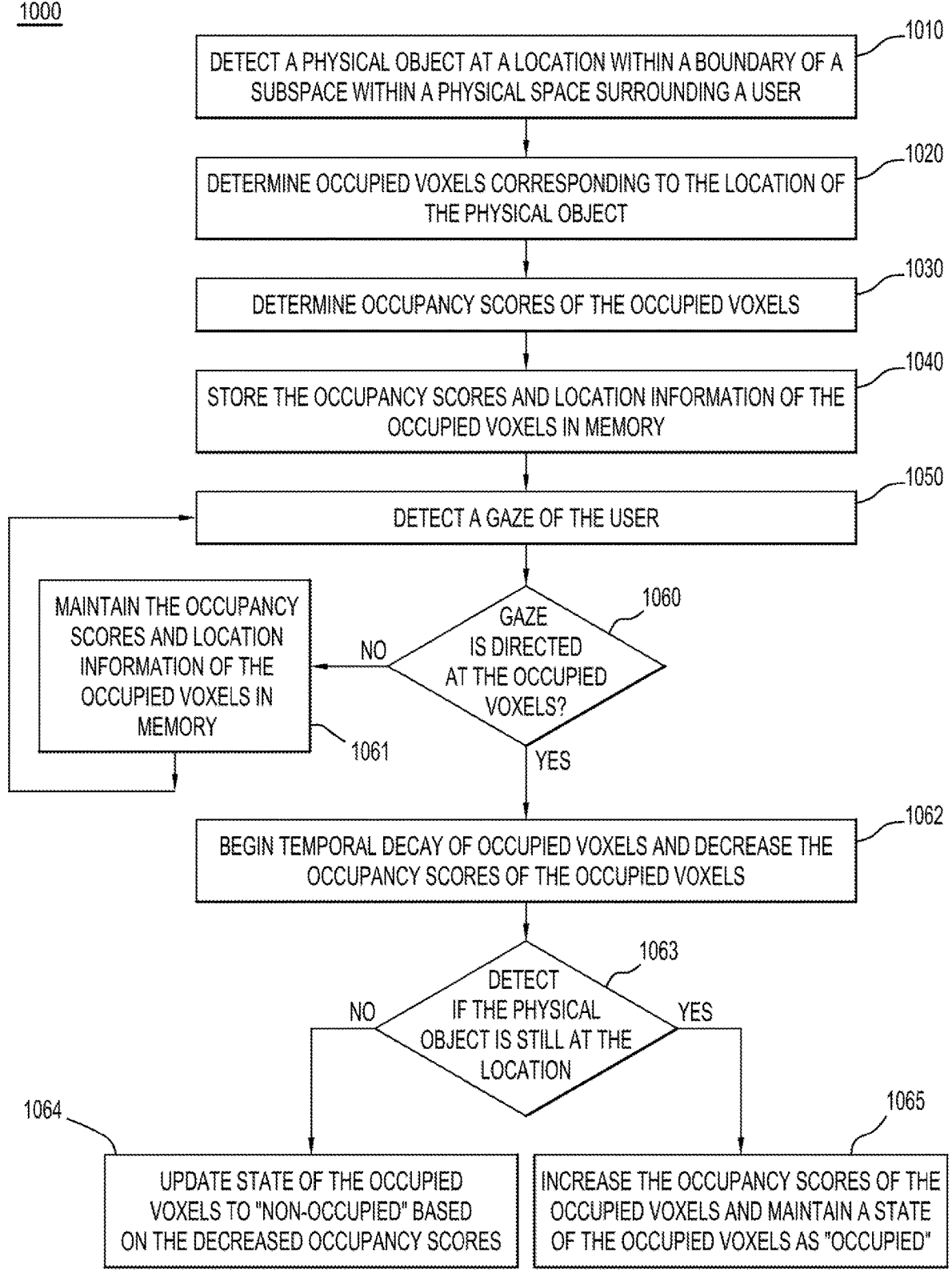
FIG. 10 illustrates an example method of the temporal decay of occupied voxels.

FIG. 10 illustrates an example method 1000 of the temporal decay of occupied voxels. In order to ensure that voxels previously determined to be occupied are freed within an acceptable timeframe, continuous reinforcement of detected obstacles may be used. Each point within a voxel has a lifespan; when that lifespan expires, its vote that is contributed to its respective voxel is removed, unless the feature that corresponds to the point is re-detected. Thus, if an intruding object is moved, the 3D points that corresponded to it will decay away over time, and, as the number of points within the corresponding voxel decreases, the state of the voxel will change from "occupied" to "unknown" or "free". However, the voxels that are subject to this temporal decay may be selected to be those within a user's current field of view. Decaying all occupied voxels in a scene may result in forgetting the entire state of the space surrounding the user, so that the system cannot reason about anything detected behind the user even just seconds ago. Such forgetting of this state may negatively affect user safety; as an example, if the system had detected an intruding object and alerted the user, but the user continued drawing the boundary of the guardian rather than immediately fixing or moving the intruding object, the system would be unable to remind the user upon completion of the boundary that an obstacle had been detected behind them and remained to be fixed. Thus, a temporal decay function performed on voxels a user is currently looking at may enable the system to balance user safety with measurement likelihood, reconstruction noise, and user expectations for how long it may take a voxel to be updated.

Method 1000 may begin at step 1010, in which the intrusion detection system detects a physical object at a location within a boundary of a subspace, or guardian, within a physical space surrounding a user. At step 1020, the system may determine occupied voxels corresponding to the location of the physical object, and at step 1030, the system may determine occupancy scores of those occupied voxels. Subsequently, at step 1040, the system may store these occupancy scores and location information of the occupied voxels in memory.

At step 1050, the intrusion detection system may detect a gaze of the user, and at step 1060, the system may determine whether the detected gaze is directed at the occupied voxels (e.g., whether the gaze is directed at the location of the physical object, which is represented by the occupied voxels). If the gaze of the user is not directed at the occupied voxels, and thus the user is not looking at the object corresponding to those occupied voxels, the system may proceed to step 1061, in which the occupancy scores and location information of the occupied voxels are maintained in memory. Subsequently, the system may receive, from the user, a second user input indicating that the boundary of the guardian is completed. The system may then retrieve the location of the physical object from memory and issue an alert to the user indicating that the portion of the virtual object corresponding to the physical object is within the guardian at the stored location of the physical object, thus reminding the user that there was a detected obstacle that the user has not yet dealt with. If the user then looks toward the physical object, the system may display, to the user, the occupied voxels corresponding to the physical object.

If the gaze of the user is directed at the occupied voxels, the method may proceed to step 1062, in which the system may begin the temporal decay of occupied voxels, and may thus decrease the occupancy scores of those occupied voxels. As an example, the temporal decay algorithm may use a constant decay rate, with parameters selected such that voxels at a certain distance (e.g., 2 cm) from the device are freed within a timeframe (e.g., 1 second) that will not unreasonably hinder a user from proceeding to gameplay, if those voxels are not reinforced within that timeframe by stereo detection of 3D points.

At step 1063, the intrusion detection system may determine, based on spatial points, whether the physical object is likely to have moved. In particular embodiments, the system may detect whether the physical object is still at the location, using, for example, stereo reconstruction. If the system detects that the physical object is not likely to have moved and thus most likely still exists at the location, the system may increase the occupancy scores of the occupied voxels and maintain a state of the occupied voxels as "occupied", thus counteracting the temporal decay process. By contrast, if the system detects that the physical object is likely to have moved and thus is likely no longer at the location (for example, after being moved by the user in response to an alert indicating its intrusion), then the system may update the state of the occupied voxels to "non-occupied" or "unknown" based on the decreased occupancy scores resulting from the gradual disappearance of the stereo points within the voxel. Thus, in an example in which a user received an alert about an object intruding into his guardian at a first location and responded by moving the object away from that first location, the visualization of the intruding object at the first location presented to the user (e.g., as a visualization of red voxels) may now slowly disappear over the course of a timeframe (e.g., 1 second) as the user looks at that first location. Because the voxels had a maximum value (for example, a maximum of 10), decreasing the votes, and thus the occupancy scores, of the voxels does not take an overly long amount of time; by contrast, without that maximum value, decaying the voxel vote by vote may require a user to gaze at the now empty first location for an unreasonable amount of time.

Systems and Methods

Figure 11:
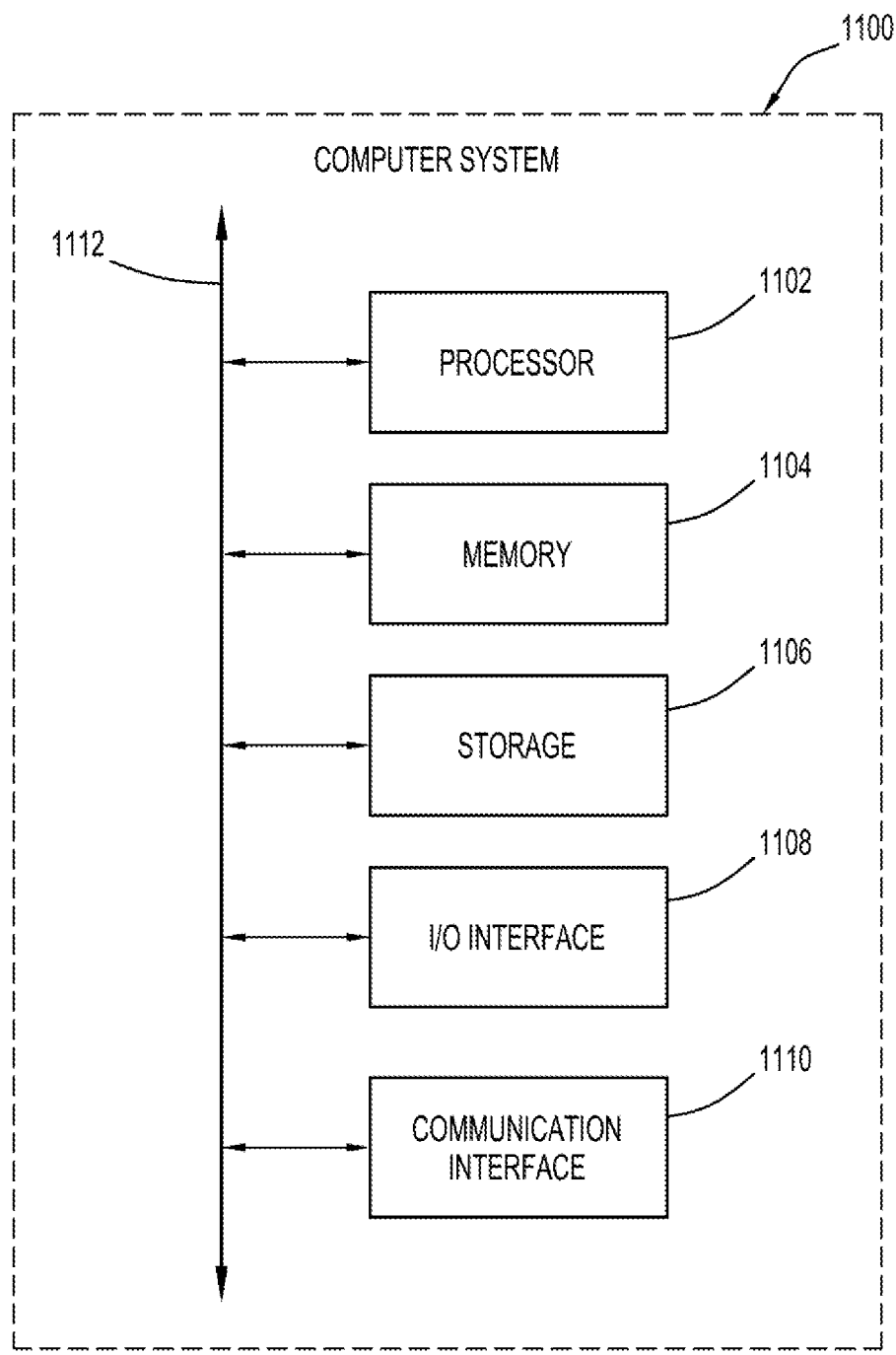
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
generating a plurality of spatial points based on depth measurements of physical objects within a physical space surrounding a user;
determining, based on the spatial points, a location at which a physical object is likely to exist;
rendering, based on the location of the physical object, a virtual space representing the physical space, wherein the virtual space includes a virtual object representing the physical object;
displaying the virtual space to the user;
while displaying the virtual space:
receiving input from the user creating a boundary of a subspace within the virtual space, and
in response to receiving the input, detecting that at least a portion of the virtual object is within the subspace; and
updating the virtual space to indicate that the portion of the virtual object is within the subspace.

2. The method of claim 1, wherein the boundary is open.

3. The method of claim 1, wherein:
the boundary comprises a predicted portion; and
detecting that the portion of the virtual object is within the subspace comprises detecting that the portion of the virtual object intersects the predicted portion of the boundary.

4. The method of claim 1, further comprising issuing an alert to the user indicating the portion of the virtual object.

5. The method of claim 4, further comprising receiving, in response to the alert, a second input from the user indicating a revised boundary that excludes the portion of the virtual object from the subspace.

6. The method of claim 4, further comprising, in response to the alert, detecting a user movement of the physical object to a new location outside the boundary.

7. The method of claim 1, further comprising storing the location of the physical object in a memory.

8. The method of claim 7, further comprising:
receiving a second user input indicating that the boundary is completed;
retrieving the location of the physical object from the memory; and
issuing an alert to the user indicating that the portion of the virtual object is within the subspace at the location.

9. The method of claim 1, further comprising dividing the physical space into a plurality of voxels, each voxel having a respective occupancy state value, wherein a set of voxels corresponding to the location of the physical object have respective occupancy state values of occupied.

10. The method of claim 9, further comprising determining, for each voxel of the set, a respective occupancy score based on a subset of the plurality of spatial points that is contained within the voxel.

11. The method of claim 10, further comprising:
detecting a gaze of the user; and
determining whether the detected gaze is directed at the location of the physical object.

12. The method of claim 11, further comprising:
if the detected gaze is not directed at the location of the physical object, storing the respective occupancy scores of each voxel of the set in memory;
receiving, from the user, a second input indicating that the boundary is completed; and
issuing an alert to the user indicating the location of the physical object.

13. The method of claim 12, further comprising displaying, to the user, the set of voxels.

14. The method of claim 11, wherein if the detected gaze is directed at the location of the physical object, decreasing the respective occupancy scores of the voxels of the set.

15. The method of claim 14, further comprising determining, based on the spatial points, whether the physical object is likely to have moved.

16. The method of claim 15, wherein:
upon determining that the physical object is likely to have moved, updating the respective occupancy state values of the voxels of the set to non-occupied; and
upon determining that the physical object is not likely to have moved, increasing the respective occupancy scores of the voxels of the set.

17. The method of claim 1, further comprising:
determining a distance between the user and the portion of the virtual object; and
issuing an alert to the user if the distance is less than a threshold.

18. A system comprising one or more processors and one or more computer-readable non-transitory storage media coupled to one or more of the processors and comprising instructions operable when executed by one or more of the processors to cause the system to:
generate a plurality of spatial points based on depth measurements of physical objects within a physical space surrounding a user;
determine, based on the spatial points, a location at which a physical object is likely to exist;
render, based on the location of the physical object, a virtual space representing the physical space, wherein the virtual space includes a virtual object representing the physical object;
display the virtual space to the user;
while displaying the virtual space:
receive input from the user creating a boundary of a subspace within the virtual space, and
in response to receiving the input, detect that at least a portion of the virtual object is within the subspace; and
update the virtual space to indicate that the portion of the virtual object is within the subspace.

19. One or more computer-readable non-transitory storage media embodying software that is operable when executed to:
generate a plurality of spatial points based on depth measurements of physical objects within a physical space surrounding a user;
determine, based on the spatial points, a location at which a physical object is likely to exist;
render, based on the location of the physical object, a virtual space representing the physical space, wherein the virtual space includes a virtual object representing the physical object;
display the virtual space to the user;
while displaying the virtual space:
receive input from the user creating a boundary of a subspace within the virtual space, and
in response to receiving the input, detect that at least a portion of the virtual object is within the subspace; and
update the virtual space to indicate that the portion of the virtual object is within the subspace.

\* \* \* \* \*